United States Patent Office 3,489,719
Patented Jan. 13, 1970

3,489,719
SURFACE TREATMENT OF FINELY-DIVIDED WATER-SOLUBLE POLYMERS
Albert B. Savage and Ronald L. Glomski, Midland, Mich., assignors to The Dow Chemical Company, Midland, Mich., a corporation of Delaware
No Drawing. Filed July 5, 1967, Ser. No. 651,117
Int. Cl. C08f 27/18
U.S. Cl. 260—73   15 Claims

ABSTRACT OF THE DISCLOSURE

Finely-divided, solid, water-soluble polymers surface treated with a combination of an aldehyde, a water-soluble polyoxyethylene fatty acid ester having an HLB of about 14.5–18, and an acid catalyst have improved dispersibility in water and a dissolution time controlled by pH. The treated polymers have enhanced value as thickeners, dispersants and flocculants in aqueous systems.

BACKGROUND

Surface treatment of water-soluble polymers, particularly hydroxyl-containing cellulose derivatives, with an aldehyde cross-linking agent such as glyoxal is described by Jullander U.S. Patent 2,879,268 and Menkart & Allan U.S. Patent 3,072,635. Such treated polymers have improved dispersibility in aqueous systems, but continuous agitation is required to prevent agglomeration and their rate of dissolution and attainment of maximum viscosity is often erratic.

Anderson & Moeller U.S. Patent 2,647,064 treat aqueous methyl cellulose slurries with lauryl derivatives of sorbitan and subsequently dry the products. However, this treatment is relatively ineffective when applied to a dry granular product, the treated powder tending to float rather than disperse in water.

Recently Dierichs & Sammet describe in U.S. Patent 3,297,583 the criticality of an immediate adjustment of the aqueous dispersion pH to between 7 and 10, preferably 7.5 to 9 to obtain rapid dissolution of surface-treated water-soluble hydroxyl containing polymers. Yet, it is often desirable to delay temporarily dissolution after initial mixing to permit addition of further materials.

STATEMENT OF THE INVENTION

An improved surface treatment for finely-divided, water-soluble polymers, particularly powders having an average particle size smaller than 35–100 U.S. mesh, which provides rapid dispersibility coupled with a controlled dissolution time has now been discovered. The improved surface treated polymer is obtained by treating a dry, finely-divided polymer containing less than about 10 weight percent water with a liquid composition comprising (a) formaldehyde or a $C_2$–$C_6$ aliphatiac dialdehyde, (b) certain water-soluble surfactants and (c) an acid catalyst. More specifically, the required surfactant is a water-soluble polyoxyethylene fatty acid ester further characterized by an HLB of about 14.5–18 and the acid catalyst is a water-soluble acid with a $pK_a$ of about 5.0 or less, preferably a $C_1$–$C_6$ aliphatic carboxylic acid. To achieve controlled dissolution, the amount of acid catalyst must be sufficient to promote rapid cross-linking of the aldehyde on the polymer surface and to give a pH of about 4–6.5 when the treated polymer is dispersed in water.

The process is applicable to a wide variety of finely-divided, particulate, water-soluble polymers. It is particularly advantageous with a powdered material having an average particle size smaller than 35–100 U.S. mesh. Because of their large surface area, such finely-divided water-soluble polymers tend to trap air and float on the surface when mixed with water. Then partial hydration and particle agglomeration can occur to increase drastically the time required for complete dissolution.

By combining in a specific manner several elements which individully are only partially effective in increasing dispersability and dissolution of water-soluble polymers, the present process achieves superior results. The treated polymers readily disperse in tap water at room temperature. Continuous agitation of the dispersion is not required if the solution pH remains at about 4–6.5. Yet when the pH is adjusted by addition of a suitable base to give an alkaline medium, e.g. a pH above 7 and preferably about 7.5–9, rapid and complete dissolution of the treated polymer is obtained with development of solution properties characteristic of the untreated polymer. For example, pH adjustment of an aqueous slurry of a treated cellulose ether to be used as a thickener for latex paint gives a rapid build to full viscosity and a sparkling, clear solution.

Although the detailed mechanism of the surface treatment is not known, the critical nonionic polyoxyethylene ester surfactant appears to function both as a carrier for the aldehyde in the initial treatment of the polymer and as a dispersant and wetting agent when the treated polymer is mixed with water. The acid catalyst assures rapid cross-linking of the aldehyde on the polymer surface to yield a protective water-resistant barrier which reduces surface hydration and agglomeration when the polymer is dispersed in water. Finally when the aqueous polymer dispersion is made alkaline, the residual acid is neutralized and the protective cross-linked aldehyde barrier is unzipper to release the polymer in a form which rapidly and completely dissolves in the basic solution.

REACTANTS

A wide variety of finely-divided water-soluble polymers are advantageously treated by this process. It is particularly suitable for powders finer than about 35–100 U.S. mesh. Also, to eliminate poor dry flow and possible caking of the treated powder, the particulate polymer should be in a dry, free-flowing form prior to surface treatment. In general, an initial water content of 10 weight percent or less assures satisfactory results. The treated polymer should have a water content of less than 15 percent.

The process is particularly suited for treating nonionic, water-soluble polymers containing hydroxyl, ester or amide groups and for anionic, water-soluble polymers containing a carboxylate or sulfonate group in a neutral salt form, normally as an alkali metal or ammonium salt. By water-soluble is meant dispersible in water to provide a visually homogeneous and substantially transparent solution infinitely dilutable with water.

Typical nonionic polymers are polyvinyl alcohol, polyoxyalkylene glycols, polyacrylamide, cellulose derivatives such as methyl cellulose, hydroxypropyl methyl cellulose, hydroxyethyl cellulose, starch and starch derivatives such as hydroxyethyl starch and acetylated or alkylated starches, casein, dextrin and gelatin. Typical anionic polymers include water-soluble salts of hydrolyzed polyamide, polyacrylic acid, polystyrenesulfonic acid, polyvinyltoluenesulfonic acid, carboxymethyl cellulose and related alkyl and hydroxyalkyl derivatives, copolymers derived from maleic anhydride such as maleic anhydride-styrene copolymers, copolymers of acrylic acid and acrylamide, etc. Such water-soluble polymers are in general characterized by functional hydroxyl, ester, amide, carboxylate or sulfonate groups alone or in combination.

These water-soluble polymers are treated with a liquid composition comprising an aldehyde, a surfactant and an acid catalyst normally as a concentrated aqueous mixture.

Suitable aldehydes disclosed by Jullander U.S. Patent 2,879,268 and Menkart & Allan U.S. Patent 3,072,635 including formaldehyde, glyoxal, succinaldehyde and also other $C_2$–$C_6$ dialdehydes such as malonaldehyde, pyruvaldehyde and adipaldehyde can be used herein. But in practice, formaldehyde and glyoxal are preferred because of availability. However, formaldehyde requires careful pH control during application. Thus glyoxal is the reagent of choice. Its properties including rapid and reversible surface cross-linking in the presence of an acid catalyst are ideally suited for this process.

The optimum amount of aldehyde required for the surface treatment depends, in part, on the surface area of the particulate polymer. But in general about 0.1–10 and preferably about 0.3–2.0 weight percent of the active aldehyde based on dry polymer weight is suitable.

The nonionic surfactant is a critical element. Numerous nonionic surfactants have been examined, but the combination of properties required for this process have been found only with water-soluble surfactants which are polyoxyethylene fatty acid esters characterized by an HLB of about 14.5–18. The HLB (hydrophile-lipophile balance) method is described in P. Becker "Emulsions: Theory and Practice," Reinhold Pub. Corp., New York 1957, pp. 189–196. Particularly suitable are the commercial liquid polyoxyethylene sorbitan fatty acid monoesters. These materials not only are effective dispersants for the polymers but dissolve in water to give crystal clear solutions.

Normally about 1–10 and preferably about 2–5 weight percent, of the polyoxyethylene fatty acid ester based on dry polymer weight is required. In some formulations a portion up to about 50 weight percent of the polyoxyethylene fatty acid ester can be replaced by other polyoxyalkylene surfactants having an average molecular weight of about 1,000–2,000.

To catalyze rapid surface cross-linking of the aldehyde, a compatible, water-soluble acid catalyst with a $pK_a$ value of about 5.0 or less is required. Inorganic acids such as HCl and $H_2SO_4$, or catalytic acid-salt mixture such as described by Hushebeck U.S. Patent 3,186,954 can be used. However, in practice, water-soluble $C_1$–$C_6$ aliphatic carboxylic acids such as formic acid ($pK_a$ 3.75), acetic acid ($pK_a$ 4.76), glycolic acid ($pK_a$ 3.83), lactic acid ($pK_a$ 3.86), a succinic acid ($pK_a$ 4.21) or citric acid ($pK_a$ 3.13) are preferred. Generally from about 0.05–3 and preferably about 0.2–1.0 weight percent of the acid catalyst based on dry polymer weight is required to provide rapid cross-linking of the aldehyde on the polymer surface and to assure a pH of about 4–6.5 when a treated polymer substantially free of base is dispersed in tap water.

A small amount of water or aqueous alcohol is frequently desirable in the liquid surface treating composition to obtain proper viscosity and handling characteristics for uniform application. However, to obtain the desired dry flow of the treated polymer without agglomeration, the total amount of water in the treated polymer should be less than 15 weight percent and preferably below 10 weight percent.

PROCESS CONDITIONS

The surface treatment described herein is conveniently carried out by mixing the predried, finely-divided, water-soluble polymer in a conventional blender and applying as a spray the liquid mixture of aldehyde, surfactant and acid catalyst in desired proportions. For optimum results efficient mixing and blending with a relatively long application time of about 0.2–1.0 hr. is desirable. Although the surface treatment can be carried out at room temperature, moderate heating during or after treatment up to about 110° C. provides more rapid conversion of the aldehyde. Maximum surface properties are achieved by heating for several hours at 60–80° C. or by storage for a week or more at room temperature. Optimum conditions for a specific polymer can be determined in routine tests.

The following examples illustrate more fully the present invention. Unless otherwise stated, all parts and percentages are by weight.

EXAMPLE 1

*Surface treatment of hydroxypropyl methyl cellulose.*—
A continuous ball mill was used to reduce 453 kg. of a dry granular 20–60 mesh hydroxypropyl methyl cellulose having a hydroxypropyl DS of 0.9–1.2 and a methoxyl MS of 0.75–1.2 and a standard 2% aqueous solution viscosity of about 8,000 cps. at 20° C. to a fine free-flowing powder. The ether contained less than 5% water. By screen analysis 97.5% of the powdered cellulose ether passed through a 60 U.S. mesh screen, 96.7% through a 100 U.S. mesh screen and 87.9% through a 200 U.S. mesh screen. About 41.5% had an average particle size of 100–325 mesh.

(A) A Nauta mixer (J. H. Day Co., Cincinnati, Ohio) fitted with a standard spray nozzle was charged with 100 parts of the finely powdered cellulose ether. The ether was thoroughly blended while a solution of 2.0 pt. 40% glyoxal, 2.0 pts. polyoxyethylene (20) sorbitan monolaurate with an HLB of 16.7 (Tween 20 from Atlas Chemical Industries, Inc.), 0.5 pt. of glacial acetic acid and 4.2 pts. water was applied as a fine spray over about 30 minutes. During the addition the temperature of the treated cellulose ether was gradually increased to about 68°–70° C. To complete the reaction of the added glyoxal, mixing was continued for another 2 hrs. at about 70° C. A screen analysis of the surface treated product showed an increase in the 100–325 mesh material from about 41.5% to 56.5% of the total product without any appreciable increase in the coarser material.

About 5 pts. of the treated cellulose ether readily dispersed in 100 pts. of tap water to give a hazy, easily stirred slurry having a pH of about 6–7. No viscosity build was observed after 40 minutes of gentle stirring. However, addition of sufficient $NH_4OH$ to adjust the solution pH to 8–9 yielded a clear, sparkling solution which reached a maximum viscosity of about 4,500 cps. in 10–15 minutes.

(B) Another 300 parts of the powdered hydroxypropyl methyl cellulose was placed into a Banbury mixer. While blending at room temperature the powder was sprayed with a solution of 7.2 pts. 40% glyoxal, 12 parts Tween 20, 0.79 pts. 88% formic acid and 2.89 pts. water using an air atomizer. Then the treated cellulose ether was held overnight before testing its dispersibility and dissolution rate.

An 8 g. sample was placed in a 600 ml. beaker in a 25° C. constant temperature bath and 392 g. of tap water (pH 9.15) was added. The solution was agitated with a 600 r.p.m. stirrer to give a hazy fluid dispersion with a solution pH of about 6.6 and an apparent viscosity of 50 cps. as determined with a Brookfield viscometer (#4 spindle, 60 r.p.m.) 3 minutes after initial mixing. Then 0.25 ml. of concentrated $NH_4OH$ was added. In 3 minutes a clear, lump-free solution with an apparent viscosity of 3700 cps. was obtained. A maximum apparent viscosity of 4,400 cps. was obtained about 15 minutes after the $NH_4OH$ addition. However 95% of this final viscosity developed within 6 minutes of the pH adjustment.

In a duplicate experiment with 8 g. of the untreated ball-milled cellulose ether, the cellulose ether merely floated on the surface of the water and formed an enveloping agglomerated gels which did not dissolve even on prolonged mixing.

(C) In another test, 1% powdered urea was added to a portion of the surface treated cellulose ether prepared in 1B. Then a sample was slurried with water at room temperature. The mixture dispersed readily to give an easily stirred hazy slurry. The pH remained constant for about 40 min. with a maximum apparent viscosity of about 500 cps. Then as the urea completely neutralized the residual acid catalyst, the apparent viscosity increased to 4,400 cps. 60 min. after initial mixing with water.

Other solid neutralizing agents which can be dry mixed with the treated powder include sodium bicarbonate, potassium carbonate, disodium phosphate, calcium carbonate, etc.

EXAMPLE 2

*Treatment of other polymers.*—The utility of the improved surface treatment with a variety of nonionic polymers and anionic polymers in salt form was examined using the following surface treatment formulations based on 100 parts of dry polymer and applied as a spray at room temperature.

Formulation F-1: 3 pts. 40% glyoxal, 3 pts. Tween 20, 0.6 pt. 90% formic acid and 3 pts. water.

Formulation F-2: 4 pts. 40% glyoxal; 4 pts. Tween 20, 1 pt. 90% formic acid and 4 pts. water.

Formulation F-3: 3 pts. 40% glyoxal, 3 pts. Tween 20.

Typical treatments of a number of commercial water-soluble polymers are given in Table 1.

TABLE I.—TREATMENT OF WATER-SOLUBLE POLYMERS
[WATER-SOLUBLE POLYMER]

| | Trade Name | Chemical Type | Formulation |
|---|---|---|---|
| Run: | | | |
| 3-1 | Separan MGL [1] | Polyacrylamide | F-1 |
| 3-2 | Separan AP 30 [1] | Anionic polyacrylamide | F-1 |
| 3-3 | Gelgard [1] | do | F-1 |
| 3-4 | Cellosize HEC WP 4400-H [2] | Hydroxyethylcellulose | F-1 |
| 3-5 | Natrosol 250H [3] | do | F-1 |
| 3-6 | CMC cellulose gum [3] | Sodium carboxymethylcellulose | F-1 |
| 3-7 | CMC cellulose gum [3] | do | F-2 |
| 3-8 | Separan NP 10 [1] | Polyacrylamide | F-3 |

[1] Dow Chemical.
[2] Union Carbide Corp.
[3] Hercules Inc.

In each instance the dispersibility of the finely-divided polymer in water was markedly enhanced and when complete solution was obtained it was clear and essentially haze free. With the anionic polymers solution in tap water was generally rapid. With the nonionic polymers rapid solution after dispersion required adjustment to an alkaline pH, preferably to about 8–9.5.

EXAMPLE 3

Controlled dispersibility (A) The effect of the varied surface treatments on the dispersibility of a several finely divided methyl cellulose ethers was examined by adding 2 parts of the treated ether to 100 parts of water in a round jar agitated at room temperature with a large paddle stirrer. Typical results using the following cellulose ethers are given in Table 2:

Sample 3-1: Hydroxypropylmethyl cellulose treated as described in Example 1A.

Sample 3-2: Methyl cellulose, 1,500 cps., treated with about 4.5% glyoxal as described in Menkart e.a. U.S. Patent 3,072,635 Example 6.

Sample 3-3: Methyl cellulose, 400 cps., treated as described in Jullander U.S. Patent 2,879,268 with about 0.45% glyoxal.

(B) Similar experiments demonstrate the controlled dispersibility and dissolution of other nonionic water-soluble polymers. Because of the appreciable quantity of residual base often encountered with anionic polymers in salt form, and also the buffering action of carboxylate groups, control of the solution pH at a level where effective dispersion is achieved without concurrent dissolution is more difficult. Generally a larger quantity of the acid catalyst must be used in the surface treatment of these anionic polymers or additional acid must be present in the water. However, the surface treatment without such added acid significantly improves the dispersibility of the treated anionic polymers and hence the ease with which aqueous solutions can be prepared in utilizing these polymers as flocculants, thickeners, dispersants, etc.

EXAMPLE 4

*Other surface treating compositions.*—A wide variety of surfactants and acid catalysts have been examined using a finely-divided hydroxypropyl methyl cellulose as the test substrate and 40% aqueous glyoxal as the aldehyde. Tests such as shown in Example 1 and below established the superiority of the polyoxyethylene sorbitan fatty acid esters with an HLB of about 14.5–18 as a dispersant in combination with the aldehyde and acid catalyst. These essential surfactants can in some instances be replaced in part with other nonionic polyoxyalkylene surfactants.

(A) To 100 parts of the finely powdered hydroxypropyl methyl cellulose from Example 1 was added as in 1B a solution of 2 pts. 40% glyoxal, 2 pts. Tween 20, 2 pts. of a polypropylene glycol having an average MW of 1200 (Polyglycol P-1200 from The Dow Chemical Co.), 0.4 pts. of 88% formic acid and 2 pts. water. After complete addition, the blended material was divided into 2 portions. One portion (4A-1) was aged at room temperature while the second (4A-2) was oven aged in a sealed container for 24 hrs. at 60° C.

Both samples dispersed well in tap water, sinking rapidly when sprinkled on the surface. When sufficient NH$_4$OH to increase the pH to about 10 was added to a slurry prepared with 4A-1 as in Example 1B rapid dissolution occurred with about 85% of the build to a maximum apparent viscosity of 4400 cps. occurring within 3 minutes of the NH$_4$OH addition. The final clear solution had a pH of 9.

TABLE II.—DISPERSIBILITY OF SURFACE TREATED CELLULOSE ETHERS

| Water | Initial pH [1] | | | Final pH [2] | | | Dispersibility | | |
|---|---|---|---|---|---|---|---|---|---|
| | 3-1 | 3-2 | 3-3 | 3-1 | 3-2 | 3-4 | 3-1 | 3-2 | 3-3 |
| Deionized | 6.0 | 5.6 | 5.6 | 4.2 | 5.3 | 5.6 | Excellent [3] | Fair | Fair. |
| Tap water | 9.2 | 8.9 | 8.9 | 6.6 | 7.7 | 7.6 | do.[3] | Poor | Poor. |
| Dil. NaOH | 9.2 | 9.2 | 9.2 | 4.2 | 6.6 | 6.9 | do.[3] | Poor [4] | Poor.[4] |
| Do | 10.2 | 10.2 | 10.2 | 4.5 | 10.2 | 10.1 | do.[3] | do.[4] | do.[4] |
| Dil. NH$_4$OH | 9.2 | 9.2 | 9.2 | 8.4 | 8.7 | 8.9 | Excellent [4] | do.[4] | do.[4] |

[1] pH of water prior to addition of the cellulose ether.
[2] pH of water after mixing with cellulose ether.
[3] No viscosity build after 40 minutes mixing.
[4] Rapid dissolution and viscosity build.

(B) The process of Example 1B was repeated using 100 parts of the powdered cellulose ether and a solution of 2 pts. 40% glyoxal, 2 pts. Tween 20, 1 pt. of a polypropylene glycol MW 1200, 1 pt. of a polyglycol derived from an equimolar mixture of ethylene and propylene oxides with an average MW of 1700 (Ambiflo H–149 from The Dow Chemical Co.), 0.4 part 88% formic acid, and 2.0 parts of water.

The treated cellulose ether dispersed readily in water at pH 6 with no significant viscosity build until the pH was adjusted to 9 with $NH_4OH$. Then 46% of the viscosity developed in 1 minute, 90% in 3 minutes and full viscosity in 6 minutes.

The treated cellulose ethers described in these Examples are readily incorporated into latex paint formulations as premixed solutions or slurries in water or in solvents as well as in dry form. Improved color development, flow and leveling, and ease of handling result. Other cellulose ethers, such as hydroxybutyl methyl cellulose used in adhesive formulations, have enhanced properties when similarly treated. For example, several bags of a premixed dry adhesive formulation can be separately added to water and then slurried together before adjusting the pH to obtain the viscosity build.

We claim:
1. In a process for surface treating finely-divided water-soluble polymers with an aldehyde to improve dispersion and dissolution in aqueous solution, the improvement which comprises: treating (1) a dry, free-flowing, water-soluble anionic polymer with functional carboxylate or sulfonate groups in salt form or nonionic polymer with functional hydroxyl, ester, or amide groups, said polymer having an average particle size finer than 35–100 mesh, at a temperature up to about 110° C., with (2) an aqueous mixture based on dry weight of said polymer comprising
   (a) about 0.1–10 weight percent of formaldehyde or a $C_2$–$C_6$ aliphatic dialdehyde,
   (b) about 1–10 weight percent of a water-soluble polyoxyethylene fatty acid ester surfactant having an HLB of 14.5–18, and
   (c) about 0.05–3.0 weight percent of an acid catalyst having a $pK_a$ less than about 5.0; and obtaining a surface treated polymer containing less than 15 weight percent water which is dispersible in water at pH 4–6.5 and rapidly soluble in water at pH 7–10.

2. The process of claim 1 where the finely-divided polymer has an average particle size finer than 35–100 mesh, the aldehyde is glyoxal, and the surfactant is a polyoxyethylene sorbitan fatty acid monoester.

3. The process of claim 1 wherein the finely-divided polymer is a water-soluble nonionic polymer with functional hydroxyl, ester or amide groups.

4. The process of claim 1 where the finely-divided polymer is a water-soluble anionic polymer with functional carboxylate or sulfonate groups in salt form.

5. The process of claim 1 where the finely-divided polymer is a nonionic water-soluble cellulose ether.

6. The process of claim 1 where the finely-divided polymer is a water-soluble polyacrylamide.

7. The process of claim 1 where the aldehyde is glyoxal.

8. The process of claim 1 where the acid catalyst is a $C_1$–$C_6$ aliphatic carboxylic acid.

9. The process of claim 1 where a water-soluble hydroxypropyl methyl cellulose having an average particle size finer than 35–100 U.S. mesh is treated with an aqueous solution comprising glyoxal, polyoxyethylene sorbitan monolaurate and a $C_1$–$C_6$ aliphatic carboxylic acid.

10. A finely-divided water-soluble polymer surface treated by the process of claim 1.

11. The product of claim 10 where the polymer is a nonionic water-soluble cellulose ether.

12. The product of claim 10 where the polymer is a water-soluble carboxymethyl cellulose.

13. The product of claim 10 where the polymer is a water-soluble polyacrylamide.

14. A process for preparing an aqueous solution of a nonionic water-soluble cellulose ether which comprises dispersing a finely-divided cellulose ether surface treated by the process of claim 1 in water to give an aqueous dispersion with a pH of about 4–6.5 and subsequently adjusting the pH to about 7–10 to obtain rapid dissolution of the dispersed polymer.

15. The process of claim 14 where the cellulose ether is a hydroxypropyl methyl cellulose having an average particle size finer than about 35–100 U.S. mesh.

References Cited

UNITED STATES PATENTS

| | | | |
|---|---|---|---|
| 2,475,846 | 7/1949 | Lundberg | 260—89.7 XR |
| 2,486,192 | 10/1949 | Minsk et al. | 260—89.7 |
| 2,761,834 | 10/1956 | Suen et al. | 260—89.7 XR |
| 2,879,268 | 3/1959 | Jullander. | |
| 2,647,064 | 7/1953 | Anderson et al. | |
| 3,072,635 | 1/1963 | Menkart et al. | |
| 3,297,583 | 1/1967 | Dierich et al. | |
| 3,402,137 | 9/1968 | Fischer et al. | 260—29.6 |

FOREIGN PATENTS

| | | |
|---|---|---|
| 738,047 | 10/1955 | Great Britain. |
| 1,070,398 | 5/1967 | Great Britain. |

OTHER REFERENCES

Calculation of HLB Values of Non-Ionic Surfactants, by Griffin—Journal of Society of Cosmetic Chemists, pp. 249–255. Vol. V, No. 4, 1954.

JOSEPH L. SCHOFER, Primary Examiner

WILLIAM F. HAMROCK, Assistant Examiner

U.S. Cl. X.R.

260—67, 78.5, 79.3, 80, 80.3, 89.7, 91.1, 91.3, 232, 233.3